US012061711B2

(12) United States Patent
Dimble et al.

(10) Patent No.: US 12,061,711 B2
(45) Date of Patent: Aug. 13, 2024

(54) CREDENTIAL-BASED DATA ACCESS AND SYNTHESIS

(71) Applicant: The Boeing Company, Chicago, IL (US)

(72) Inventors: Atul Uttam Dimble, Bengaluru (IN); Kiran Narayan, Bengaluru (IN); Ryan B. Whitaker, Mount Pleasant, SC (US)

(73) Assignee: The Boeing Company, Arlington, VA (US)

( * ) Notice: Subject to any disclaimer, the term of this patent is extended or adjusted under 35 U.S.C. 154(b) by 303 days.

(21) Appl. No.: 17/445,363

(22) Filed: Aug. 18, 2021

(65) Prior Publication Data

US 2023/0056439 A1 Feb. 23, 2023

(51) Int. Cl.
*G06F 21/62* (2013.01)
*G06F 16/245* (2019.01)
*G06F 21/60* (2013.01)
*G06N 3/08* (2023.01)

(52) U.S. Cl.
CPC ........ *G06F 21/6218* (2013.01); *G06F 16/245* (2019.01); *G06F 21/602* (2013.01); *G06N 3/08* (2013.01)

(58) Field of Classification Search
CPC .. G06F 21/6218; G06F 16/245; G06F 21/602; G06N 3/08; G06N 3/045; G06N 3/0475; G06N 5/04; G06N 20/00; G06N 5/022
See application file for complete search history.

(56) References Cited

U.S. PATENT DOCUMENTS

| | | | | |
|---|---|---|---|---|
| 10,475,438 | B1* | 11/2019 | Chicote | G10L 13/033 |
| 11,373,350 | B2* | 6/2022 | Suzuki | G06N 3/088 |
| 11,531,863 | B1* | 12/2022 | Zweig | G06F 40/30 |
| 2009/0112835 | A1* | 4/2009 | Elder | F16K 15/16 |
| 2010/0146583 | A1* | 6/2010 | Prehofer | G06Q 30/02 726/1 |
| 2013/0179985 | A1* | 7/2013 | Strassmann | H04L 63/0428 726/26 |

(Continued)

OTHER PUBLICATIONS

Cem Dilmegani, "Synthetic Data Generation: Techniques, Best Practices & Tools", Available Online at https://research.aimultiple.com/synthetic-data-generation/, Published Jul. 15, 2020, 16 pages.

*Primary Examiner* — Meng Li
(74) *Attorney, Agent, or Firm* — Alleman Hall & Tuttle LLP

(57) ABSTRACT

A method at a computing system is described. The method comprises receiving on behalf of a user a request for information, determining access credentials of the user, and based at least on the access credentials, identifying a first portion of the information that the user has permission to access, and a second portion of the information that the user does not have permission to access. The method further comprises obtaining synthesized data configured to replace at least part of the second portion of the information, the synthesized data being different than the second portion of information, relevant to the request, and not including any information that the user does not have permission to access, and providing a data set for access by the user, the data set including the first portion of the information and the synthesized data.

20 Claims, 11 Drawing Sheets

(56) References Cited

U.S. PATENT DOCUMENTS

| | | | | |
|---|---|---|---|---|
| 2014/0123307 | A1* | 5/2014 | Jung | G06F 21/60 |
| | | | | 726/27 |
| 2016/0179887 | A1* | 6/2016 | Lisonbee | G06F 16/9024 |
| | | | | 707/718 |
| 2017/0161439 | A1* | 6/2017 | Raduchel | G16H 10/60 |
| 2018/0113718 | A1* | 4/2018 | Bhamidipati | G06F 9/451 |
| 2018/0293363 | A1* | 10/2018 | Asati | G06F 21/12 |
| 2019/0392194 | A1* | 12/2019 | Croxford | G06F 18/2431 |
| 2020/0371850 | A1* | 11/2020 | Sharifi | H04L 51/214 |
| 2021/0014760 | A1* | 1/2021 | Kannan | H04W 36/245 |
| 2021/0026982 | A1* | 1/2021 | Amarendran | G06F 21/6254 |
| 2021/0110451 | A1* | 4/2021 | Marchant | G06Q 30/01 |
| 2021/0165680 | A1* | 6/2021 | Laschinger | H04L 67/10 |
| 2021/0209246 | A1* | 7/2021 | Valecha | G06F 21/602 |
| 2021/0383020 | A1* | 12/2021 | Sofia | G06F 21/6254 |
| 2023/0051713 | A1* | 2/2023 | Paula | G06N 3/08 |
| 2023/0056439 | A1* | 2/2023 | Dimble | G06N 5/022 |
| 2023/0254333 | A1* | 8/2023 | Johnston | G06F 21/552 |
| | | | | 726/22 |

* cited by examiner

| Material | Density | Tensile Strength |
|----------|---------|------------------|
| A | 7.8 | 450 |
| B | 8.73 | 500 |
| C | 19.25 | 1510 |
| D | 1.75 | 1600 |

⇑

202 →

| Material | Density | Tensile Strength |
|----------|---------|------------------|
| A | 7-9 | 400-500 |
| B | 7-9.5 | 450-550 |
| C | 18-20 | 1480-1520 |
| D | 1-2 | 1550-1650 |

| Material | Density | Tensile Strength |
|----------|---------|------------------|
| A | 7.8 | 450 |
| B | 8.73 | 500 |
| C | 19.25 | 1510 |
| D | 1.75 | 1600 |

⇑

204 →

| Material | Density | Tensile Strength |
|----------|---------|------------------|
| A | 8.6* | 410* ← 205 |
| B | 7.5* | 490* |
| C | 19.75* | 1485* |
| D | 1.1* | 1630* |

| Part | Material |
|------|----------|
| Engine | Proprietary alloy |
| Engine | Proprietary ceramic |
| Cabin | Confidential polymer |

⇑

208 →

| Part | Material |
|------|----------|
| Engine | Alnico |
| Engine | Barium titanate |
| Cabin | Polypropylene |

| Material # | Part # | Part type |
|------------|--------|-----------|
| 1564813 | L232SFJ | Switch |
| 4894132 | R32FJ7S | Mount |
| 7456489 | K3278S2 | Chain |
| 3454821 | KR3292Z | Fitting |

⇑

212 →

| Material # | Part # | Part type |
|------------|--------|-----------|
| 7894126 | A189JUI | Mount |
| 8951548 | K85SN7O | Fitting |
| 2151597 | X4512R3 | Switch |
| 1489126 | AB4112Y | Chain |

CREDENTIAL-BASED DATA ACCESS AND SYNTHESIS

FIELD

The present disclosure relates to credential-based data access, and more particularly to synthesizing data based on user access credentials.

BACKGROUND

The operation of modern organizations frequently involves large quantities of logically and/or geographically dispersed data. A typical multinational corporation, for example, has multiple geographically dispersed sites that each generate site-specific data, such as testing facilities that generate data regarding product tests; manufacturing facilities that generate data regarding product manufacturing; and regional campuses. The geographic separation of facilities, along with trends such as increasing digitization, machine learning, and emergence of low-cost/low-power sensor devices, are among the factors driving a dramatic expansion in dispersed data. Handling such data can pose significant challenges. When a data set is required, for example to guide the redesign of a product component, one challenge includes locating all the relevant data. Despite the immense processing and storage capacity of modern computing systems, locating relevant data in a dispersed system often involves at least partially manual searching. This may be conducted by a data engineer or data steward, who may need to interact with others—e.g., members of different product teams—to locate data. Additional processing of the data by human operators can also take place, such as data extraction, cleaning, and transformation. This type of manual involvement in procuring dispersed data can introduce significant delays between the time at which a data set is requested and the time at which the data set is provided, which in turn can render the data set stale upon provision.

The procurement of dispersed data can also be complicated by user access credentials. In a typical organization, access to data is governed at least in part by access credentials assigned to individuals in the organization. Issues in procuring dispersed data can arise when the access credentials of an individual requesting data differ from the access credentials of an individual attempting to procure the data. Where the procuring individual does not have sufficient credentials to access data, input from other individuals can be required to authorize the release of the data, which can further delay data procurement and introduce additional pathways by which security and confidentiality can be compromised. In other examples, insufficient access credentials can prohibit the provision of requested data entirely, even when only a relatively small portion of the requested data cannot be accessed by a procuring individual.

Security concerns can arise with the movement of data, such as from a system of record to a data lake or warehouse. These can include concerns regarding the internal security of an organization, for example in the interest of maintaining data confidentiality organization-wide and/or among departments. The movement of data among different locations can pose external concerns regarding regulatory compliance, however. Some countries, for example, have regulations that impose constraints on the export of certain types of data. Data that is subject to these types of export regulations may not be exportable, even when the individuals requesting and procuring the data possess sufficient organizational access credentials.

In view of the above, challenges exist in procuring dispersed data in a secure and confidential manner, and in compliance with data/export regulations.

SUMMARY

To address the above issues, according to one aspect of the present disclosure, at a computing system, a method is provided. In this aspect, the method comprises receiving on behalf of a user a request for information, determining access credentials of the user, and based at least on the access credentials, identifying a first portion of the information that the user has permission to access, and a second portion of the information that the user does not have permission to access. The method further comprises obtaining synthesized data configured to replace at least part of the second portion of the information, the synthesized data being different than the second portion of information, relevant to the request, and not including any information that the user does not have permission to access, and providing a data set for access by the user, the data set including the first portion of the information and the synthesized data.

Another aspect of the present disclosure relates to a computing system. In this aspect, the computing system comprises a logic subsystem, and a storage subsystem comprising instructions executable by the logic subsystem to receive on behalf of a user a request for information, determine access credentials of the user, and based at least on the access credentials, identify a first portion of the information that the user has permission to access, and a second portion of the information that the user does not have permission to access. In this aspect, the storage subsystem further comprises instructions executable by the logic subsystem to obtain synthesized data configured to replace at least part of the second portion of the information, the synthesized data being different than the second portion of information, relevant to the request, and not including any information that the user does not have permission to access, and provide a data set for access by the user, the data set including the first portion of the information and the synthesized data.

Another aspect of the present disclosure relates to a method at a computing system. In this aspect, the method comprises receiving on behalf of a user a request for information, determining access credentials of the user, and based at least on the access credentials, identifying a first portion of the information that the user has permission to access, and a second portion of the information that the user does not have permission to access. In this aspect, the method further comprises generating, via one or more neural networks trained based at least on non-synthesized data, synthesized data configured to replace at least part of the second portion of the information, the synthesized data being different than the second portion of information, relevant to the request, and not including any information that the user does not have permission to access, and providing an encrypted data set for access by the user, the data set including the first portion of the information and the synthesized data.

The features, functions, and advantages that have been discussed can be achieved independently in various embodiments or can be combined in yet other embodiments, further details of which can be seen with reference to the following description and drawings.

BRIEF DESCRIPTION OF THE DRAWINGS

FIGS. 2A-2D show illustrations depicting example data sets that include synthesized data.

DETAILED DESCRIPTION

Figure 1:
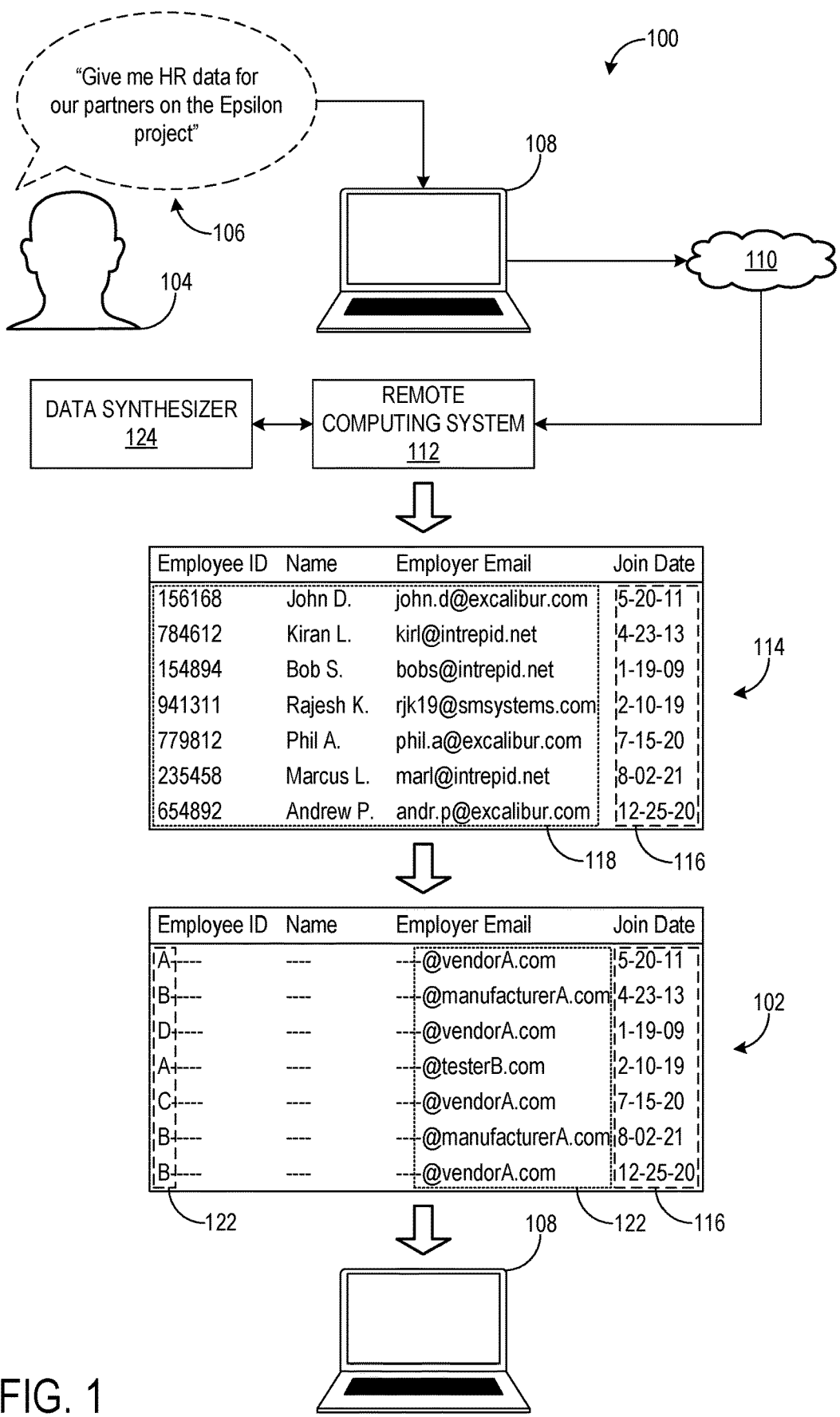
FIG. 1 shows an illustration depicting an example pipeline in which a data set is procured in response to a user requesting information.

In view of the considerations discussed above, systems and methods are provided that relate to providing data sets that are at least partially synthesized based on the access credentials of users requesting the data sets. In one example, a request for information is received on behalf of a user, and access credentials of the user are determined. The access credentials can include various information regarding the user including but not limited to their identity, security clearances, location, and/or citizenship. Any type of access-relevant consideration can be embedded in the credentials that are used in data synthesis. Based at least on the access credentials, a first portion of the information requested by the user is identified that the user has permission to access, and a second portion of the requested information is identified that the user does not have permission to access. Synthesized data is obtained that is different than the second portion of information and configured to replace at least part of the second portion of the information, yet is relevant to the request and does not include any information that the user does not have permission to access. A data set is then provided for access by the user that includes the first portion of the information and the synthesized data.

By providing data sets with information that a requesting user has sufficient access credentials to access, but with synthesized data in place of information that the requesting user does not have sufficient credentials to access, requested information can be provided to the user without disclosing confidential information or breaching security protocol. Further, synthesized data can be formulated to be relevant and thus potentially useful in servicing requests for information, in contrast to approaches that merely redact information to which access is not permitted. Where the provision of a data set is subject to data/export regulations—e.g., in the event of the data set being transferred among different countries—the data set can be procured in compliance with such regulations. Further, the inclusion of synthesized data is such that the information that the user is not authorized to access does not obviate the provision of the information that the user is authorized to access, in contrast to other data provision mechanisms that can fail to provide any part of a data set if access to any portion is not authorized. In addition to tailoring the contents of a data set according to the access credentials of its requesting user, access to the data set can be configured for the requesting user via encryption described below, further enhancing the security of data procurement. Moreover, aspects are disclosed that relate to automating the procurement of dispersed data. As described below, such automation can reduce the involvement of human users in locating and procuring data, which in turn can reduce turnaround times for data and improve security, and reduce or obviate the use of a data lake, warehouse, or the like.

FIG. 1 depicts an example pipeline 100 in which a data set 102 is procured in response to a user 104 requesting information. The contents of data set 102 are selected based on the access credentials of user 104. As described below, data set 102 includes a portion of information requested by user 104 that the user 104 has permission to access, and a synthesized portion of data that replaces at least part of another portion of requested information that the user 104 does not have permission to access. In the depicted example, user 104 places a request 106 for information regarding participants of a particular project. In this example, request 106 is placed in the form of a natural language request spoken by user 104. However, user 104 can place requests in any suitable form such as inputting with a keyboard, mouse, touch screen display, or other input device, including natural language requests in the form of voice or text. Supporting natural language requests for information can greatly reduce the involvement by human users in procuring data in service of such requests, which in turn can promote faster turnarounds for requests and reduce the potential for the improper handling of data by human users.

Request 106 is received at a computing device 108 (e.g., via a microphone) local to user 104, and transmitted via a network 110 to a remote computing system 112. In this example, natural language processing (NLP) is performed on request 106 to understand the intent of user 104 in issuing the request 106. NLP can be performed at computing device 108, remote computing system 112, or in part at the computing device 108 and in part at the remote computing system 112. Thus, it will be understood that transmitting request 106 to remote computing system 112 can include transmitting any suitable aspect of the request 106, including but not limited to an audio sample capturing the request 106, a transcription of the request 106, a tokenization of the request 106, feature(s) derived from the request 106, and/or other information derived from the request 106.

Remote computing system 112 evaluates request 106 to (1) identify information relevant to the request 106, (2) locate sources where the relevant information is stored, (3) and formulate processing steps for procuring and providing the relevant information to user 104. As described in further detail below, remote computing system 112 can utilize various ontologies; taxonomies; knowledge graphs, information models, and other data structures; and reasoning mechanisms in service of these and other actions to parse and ultimately fulfill request 106. As also described below, the processing steps formulated by remote computing system 112 for procuring the information relevant to request 106 can be executed at one or more computing devices. As such, remote computing system 112 can facilitate the procurement of data in a programmatic and automated manner that can greatly reduce or eliminate the involvement by human users in procuring the relevant information.

In servicing request 106, remote computing system 112 evaluates access credentials assigned to user 104 to identify portions of information relevant to the request 106 that the user is permitted to access—per their access credentials—and portions of relevant information that the user is not permitted to access—also per their access credentials. The access credentials of user 104 can be stored at remote computing system 112 and/or at another location external to the remote computing system (e.g., a human resources database managed by an organization to which user 104 belongs), for example. Any suitable information can be included in the access credentials of user 104 and evaluated in procuring data for the user 104. As examples, the access credentials of user 104 can include one or more of a geographic location of the user 104, which can include an identification of a city, county, state, province, principality, country, and/or continent, geographic coordinates, and/or any other suitable geographic or location-related information; citizenship information regarding the user 104, which can include an identification of one or more countries in which the user 104 has citizenship; a country in which the user 104 typically resides; biographic information regarding the user 104; security clearance(s) held by the user 104; and organizational access credential(s) assigned to the user 104, which can include information regarding seniority, roles, departmental/group membership, and/or other organizational information.

FIG. 1 depicts a data set 114 that includes information identified by remote computing system 112 as being relevant to request 106 issued by user 104. Among this relevant information, and by evaluating the access credentials assigned to user 104, a first portion 116 of the information that user 104 has permission to access is identified, and a second portion 118 of the information that the user 104 does not have permission to access is identified. In the depicted example, first portion 116 includes the dates on which the participants of the project referenced in request 106 joined their respective organizations. Conversely, second portion 118, which user 104 is not permitted to access, includes a set of employee ID numbers for the project participants, the names of the participants, and the organizational email addresses of the participants.

As described above, data set 102 is provided for access by user 104 in service of satisfying request 106. In contrast to data set 114, data set 102 does not include second portion 118 or any other information that user 104 does not have permission to access per their access credentials—i.e., it is "cleaned" in the sense that it does not contain prohibited data. As seen therein, at least part of second portion 118 that user 104 is not permitted to access can be masked, redacted, removed, or otherwise omitted from the data set 102 that is ultimately provided to the user 104. However, data set 102 includes synthesized data 122 configured to replace at least part of second portion 118. Unlike second portion 118, synthesized data 122 does not include any information that user 104 does not have permission to access. However, while being different than second portion 118, synthesized data 122 is relevant to request 106 issued by user 104. More particularly, synthesized data 122 replaces the organizational email addresses in second portion 118 with synthesized partial email addresses. Unlike the email addresses in second portion 118, the synthesized email addresses do not identify the individual project participants or the specific organizations to which they belong, but instead identify the type of organization—such as vendors, manufacturers, and testers—to which the participants belong. Accordingly, synthesized data 122 can be useful to user 104 and help fulfill request 106, for example in identifying the types and distribution of organizational partners and organizational memberships of the project participants. Synthesized data 122 further includes letters that replace the employee ID numbers of the project participants. In this example, each letter represents the seniority of the corresponding participant in their organization, and thus can be useful to user 104 and help fulfill request 106 in understanding the distribution of project participants in terms of seniority, and in prioritizing where to direct communication, as examples.

Remote computing system 112 is configured to obtain synthesized data 122 from a data synthesizer 124. As described in further detail below, data synthesizer 124 can utilize one or more neural networks (e.g., generative adversarial network) and/or other machine learning-based mechanisms that are trained based at least on non-synthesized data to generate synthesized data. Such mechanisms can be trained for different domains to provide synthesized data that is contextually-relevant to the domain(s) implicated in requests for information.

In some examples, data set 102—i.e., the data set ultimately provided to user 104 that does not include information that the user 104 is not permitted to access—can be configured for access to by the user 104 and not other users. In such examples, data set 102 can be encrypted and configured to be decrypted with a decryption key specific to user 104. As a more particular example, a public/private key pair can be created for data set 102 and user 104. Further, in some examples, the data included in data set 102 can be copied from a system of record or other originating location from which the data is obtained, such that discarding the data set 102 does not delete any of the data from the originating location. As such, and in view of its inclusion of synthesized data 122, and its relevance to user 104 and request 106, data set 102 can be referred to as being "disposable".

FIGS. 2A-2D depict additional examples of data sets that include synthesized data configured to replace at least part of information requested by users that those users are not permitted to access. In the example depicted in FIG. 2A, a data set 200 is obtained that includes the density and tensile strength of four different materials. Access to the specific values of the densities and tensile strengths by a requesting user is not permitted, however. As such, a data set 202 is provided to the requesting user that includes synthesized data comprising synthesized ranges, rather than specific values, of the densities and tensile strengths of the listed materials. The synthesized ranges can be useful to the requesting user, for example due to the limited magnitude of the ranges and their inclusion of the specific and actual values assumed by the materials. In other examples, synthesized data can include specific, synthesized values. FIG. 2B depicts one such example in which the specific densities and tensile strengths in data set 200 are replaced with specific, synthesized densities and tensile strengths in a data set 204. As one example, these synthesized values can be computed by selecting specific (e.g., randomized) values from ranges derived from the non-synthesized values—e.g., the ranges computed for data set 202. The specific, synthesized values in data set 204 can be useful to a requesting user, for example due to their relatively close proximity to the actual, non-synthesized values.

In some examples, a data set that includes synthesized data can also include an indication regarding the presence of synthesized data in the data set. FIG. 2B depicts one such example in which data set 204 is provided with an indication 205 that the synthesized data—namely, synthesized densities and tensile strengths—are synthetic. In this example, indication 205 is of the form of an asterisk placed next to each synthetic value, but can assume any suitable form (e.g., other symbols, different formatting than the formatting applied to non-synthesized data such as different font color). In other examples, a data set can be provided with a general indication that synthesized data is present in the data set, but otherwise may not identify which specific values are synthetic. Further, examples are possible in which, where a range of values are provided as in the example of FIG. 2B, an indication of the range can be provided (e.g., as an error, such as in the form of +/−).

FIG. 2C depicts an example in which the identities of proprietary and/or confidential materials are requested, as indicated at a data set 206. Access to these identities by the requesting user is not permitted, however. As such, the identities are replaced with synthesized data comprising the identities of materials that are not proprietary or confidential in a data set 208 that is provided to the requesting user. In this example, the materials listed in data set 208 are determined as being most similar to their proprietary and/or confidential counterparts, and thus can be useful to the requesting user—e.g., in doing a material analysis in service of identifying the source of degradation. Data set 208 represents examples in which one material of a certain type can be replaced with another material of that type—e.g., replacing an alloy with another alloy, a ceramic with another ceramic, and a polymer with another polymer.

Generally, the provision of a data set having synthesized data in place of non-synthesized and inaccessible data can include replacing materials, which can be performed on any suitable basis. As examples, a replacement material can be selected based on its correspondence to another material to be replaced, such as the correspondence of acoustic properties (e.g., absorption and reflection properties), the correspondence of chemical properties (e.g., pH, reactivity), the correspondence of electrical properties (e.g., resistivity, conductivity, polarizability, permittivity), the correspondence of magnetic properties (e.g., permeability), the correspondence of manufacturing properties (e.g., castability, machinability, ability to be additively manufactured), the correspondence of mechanical properties (e.g., bulk modulus, compressive strength, ductility, durability, elasticity, friction coefficient, hardness, malleability, plasticity, shear strength, specific weight, stiffness, surface properties, tensile strength, and viscosity), the correspondence of optical properties (e.g., absorbance, birefringence, reflectivity, refractivity), radiological properties (e.g., half-life), thermal properties (e.g., boiling point, melting point, coefficient of thermal expansion, flammability, flash point, heat of vaporization, thermal conductivity, vapor pressure), and/or any other suitable correspondences. In such examples where a material is replaced in a data set with a corresponding material, the corresponding material can be relevant to the requests that produced the data set due to this correspondence. Moreover, a corresponding material that replaces an original material in a data set can be useful to a requesting user, as the two materials can correspond highly in composition, behave similarly in operation/application/handling, etc. Assessing the types of correspondences described above can aid in identifying materials, and data in general, that can be relevant and useful to requesting users.

FIG. 2D illustrates another example in which synthesized data replaces data in a data set 210 that a requesting user is not permitted to access. Data set 210 includes the respective material number, part number, and part type of four different parts. In this example, the requesting user is not permitted to access this information—e.g., due to export regulations limiting the sharing of data set 210 between an originating country and a different destination country in which the requesting user resides. As such, the requesting user is provided a data set 212 with synthesized material numbers, part numbers, and part types. As one example, the user can be a data scientist or other individual who obtains data set 212 for the purpose of testing a model based on a hypothesis that a particular material in a part or assembly is the cause of degradation of the part/assembly. The user can provide the model to another user who is permitted to access the contents of data set 210, and/or to a process configured to validate the hypothesis, for example.

In other examples, any suitable type of synthesized data can be provided as part of any suitable type of data replacement scenario. As another example in the context of sharing human resources (HR) data, personal email addresses of human users can be replaced with synthesized email addresses as part of providing the HR data to a third-party payroll company. When sharing this HR data with an HR consultant performing salary rationalization, for example, personal email addresses, company email addresses, and the names of human users can be replaced with synthesized email addresses and synthesized names. As another example in the context of sharing financial data, for example with a research firm performing a cost analysis of a program, the names of vendors can be replaced with synthesized vendor names. As another example in the context of sharing geographic data, for example in exporting the geographic data from one country to another country, geographic coordinates can be replaced with synthesized geographic data (e.g., a more general indication of geographic location, such as a ZIP code).

Figure 3:
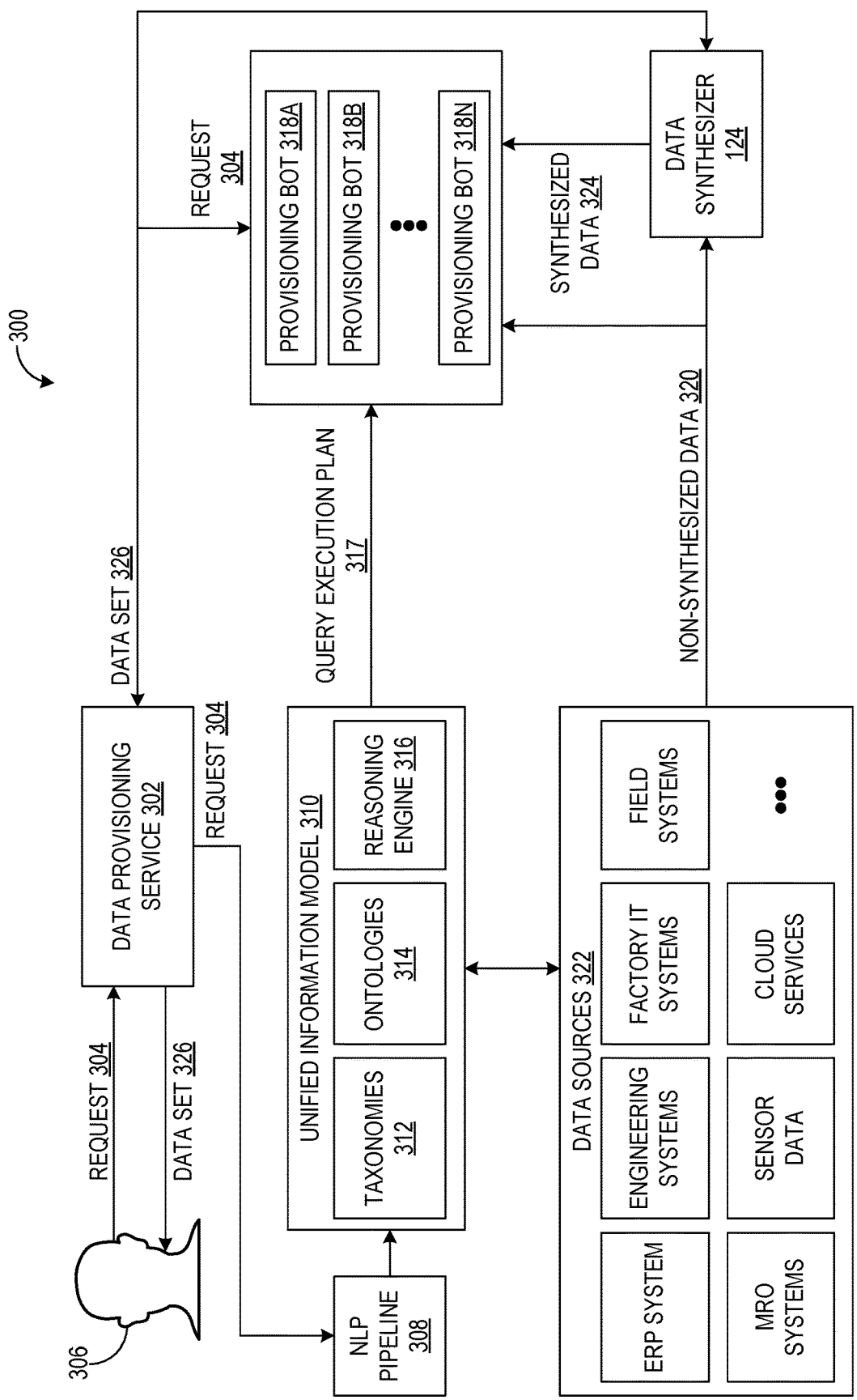
FIG. 3 shows an illustration depicting an example computing system configured to procure data based on the access credentials of requesting users.

FIG. 3 depicts an example computing system 300 configured to receive requests on behalf of users for information, and to procure data based at least on the access credentials of those requesting users. As described below, computing system 300 interfaces with data synthesizer 124 to obtain synthesized data in place of information that a requesting user is not permitted to access. Aspects of computing system 300 can be implemented by remote computing system 112, for example.

Computing system 300 can include a data provisioning service 302 configured to receive requests on behalf of users for information. To this end, service 302 can provide a front-end application programming interface (API) service to requesting users with which requests for information can be placed. As examples, the API service can support requests for information placed through an internet browser, an application, or any other suitable mechanism. Further, data sets that are procured in service of user requests for information can be provided to requesting users via service 302.

In the depicted example, a request 304 is placed by a user 306, received via data provisioning service 302, and provided to an NLP pipeline 308. In this example request 304 includes a natural language request, which can be captured in an audio sample or text provided to service 302 and NLP pipeline 308. As such, providing request 304 to NLP pipeline 308 can include providing data such as an audio sample or text representing the request 304 to the pipeline 308. NLP pipeline 308 can perform any suitable types of processing on request 304 to parse and understand the request 304. Examples of processing that NLP pipeline 308 can perform on request 304 include but are not limited to speech recognition (e.g., where the request 304 is received in the form of an audio sample), part of speech tagging, speech/word segmentation, word sense disambiguation, named entity recognition, lemmatization, stemming, sentence breaking, and terminology extraction. NLP pipeline 308 can utilize any suitable mechanisms to process request 304, such as decision trees, hidden Markov models, and/or neural networks (e.g., convolutional neural networks, recurrent neural networks).

NLP pipeline 308 can process request 304 to obtain a linguistic understanding of the request 304. This linguistic understanding can include an at least partial understanding of the intent associated with request 304, and at least some of the attributes associated with this intent. Along with the processing performed by NLP pipeline 308, other components in computing system 300 can be used to obtain a conceptual understanding of the request 304, including an understanding of the relationships among entities implicated by the request 304. This conceptual understanding can be obtained ultimately in service of locating and procuring information relevant to request 304. FIG. 3 illustrates various example components that can be used to obtain a conceptual understanding of request 304, which are shown as being implemented as part of a unified information model 310. Model 310 includes one or more taxonomies 312, which can each maintain a vocabulary of entities. Via its corresponding entity vocabulary, a taxonomy 312 can be used to identify entities in request 304 and various concepts to which those entities relate.

Figure 4:
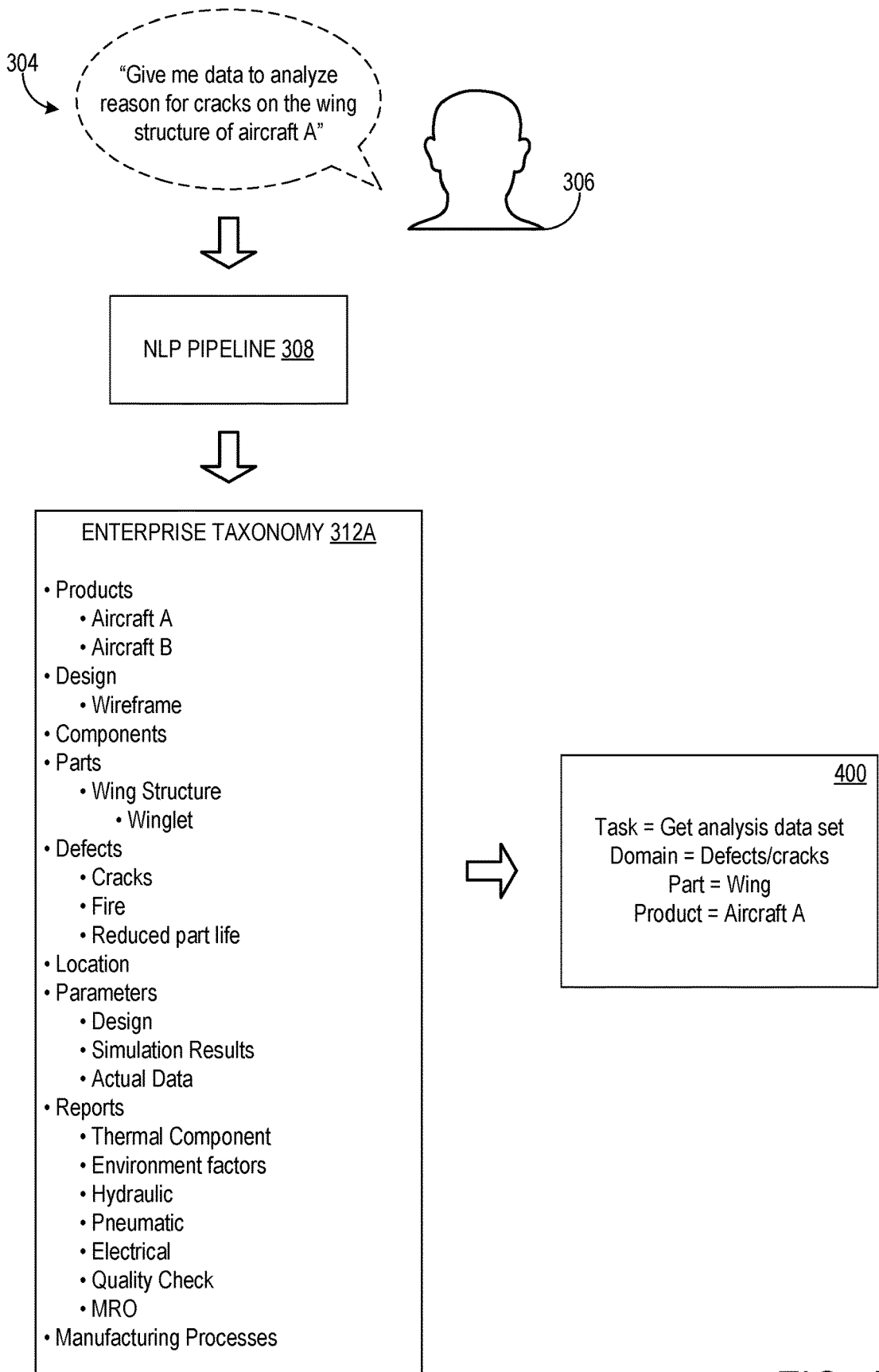
FIG. 4 shows an illustration depicting the extraction of example concepts from a request for information.

FIG. 4 depicts an example in which NLP pipeline 308 and an enterprise taxonomy 312A are utilized to extract various concepts 400 from request 304. In this example, request 304 is placed for information regarding cracks appearing on the wing structure of a particular aircraft. User 306 may be attempting to determine the cause of the cracks, for example. The concepts 400 extracted from request 304 include (1) a requested task, which comprises obtaining a data set relevant to the request 304, (2) a domain implicated by the request 304, which comprises defects/cracks, (3) a part implicated by the request 304, which comprises a wing, and (4) a product implicated by the request 304, which comprises a particular aircraft. As described below, concepts 400 can be used along with other components of information model 310 to locate and procure data relevant to request 304.

Taxonomy 312A is referred to as an "enterprise" taxonomy, as this taxonomy can be constructed and/or maintained by a particular enterprise, organization, or institution such as a manufacturer of the aircraft mentioned in request 304. Other taxonomies 312 can similarly be constructed and/or maintained by a particular organization. Moreover, each taxonomy 312 can relate to one or more domains. In such examples, taxonomies 312 can provide a conceptual vocabulary on a per-domain basis. In the example depicted in FIG. 4, enterprise taxonomy 312A provides a conceptual vocabulary for an aircraft domain. As shown therein, enterprise taxonomy 312A includes concepts such as products, which includes the aircraft described in request 304; design, which includes a wireframe design; components; parts, which includes a wing structure; defects, which includes cracks, fire, and reduced part life; location; parameters, which includes design, simulation results, and actual data; reports, which includes thermal components, environment factors, hydraulic reports, pneumatic reports, electrical reports, quality check reports, and maintenance, repair, and operations (MRO) reports; and manufacturing processes. Accordingly, enterprise taxonomy 312 can be used to obtain a conceptual understanding regarding products implicated in requests for information and their components, how design information and other data regarding those products/components can be represented, defects that can be experienced by the products/components and resultant effects, how the products/components can be designed, manufactured, maintained, and repaired, and/or other potential conceptual aspects.

Figure 5:
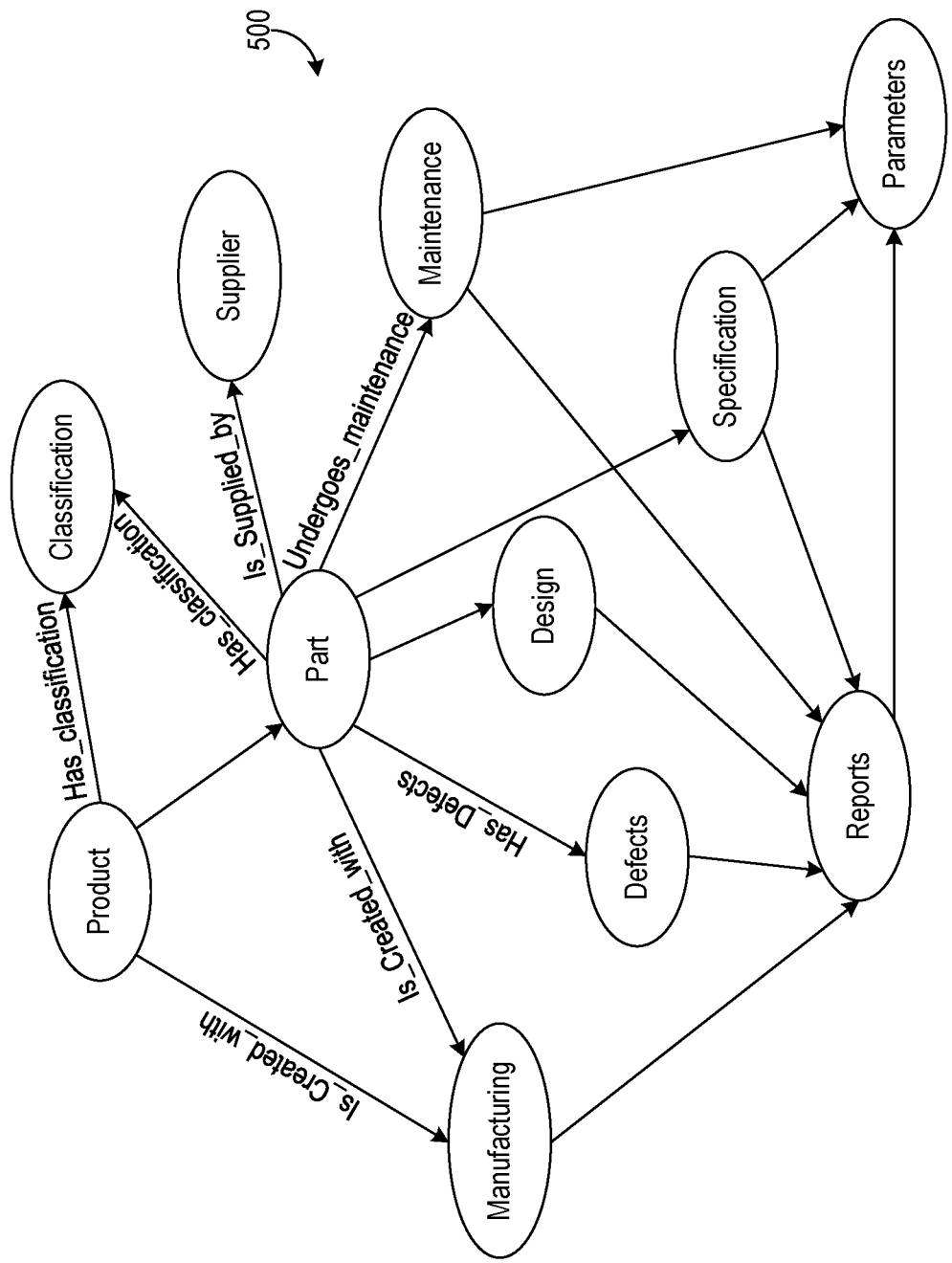
FIG. 5 shows an illustration depicting an example knowledge ontology.

Concepts identified via one or more taxonomies 312, in addition to being used to understand user requests for information, can be mapped to one or more ontologies 314, which in the example depicted in FIG. 3 form another component of unified information model 310 that can be used to obtain a conceptual understanding of such requests for information. As one example, FIG. 5 depicts a knowledge ontology 500 that includes various concepts, including concepts 400 extracted from request 304 via enterprise taxonomy 312A. Ontology 500 encodes various relationships, such as causal relationships, dependencies, and inheritances, among the concepts included therein. Among these relationships are the creation of products and parts from manufacturing, the classification of products and parts, the supply and maintenance of parts, the association of designs and specifications with parts, and the association of parameters with reports (which can be generated from manufacturing, defects, designs, or specifications), specifications, and maintenance. As such, ontology 500 can encode knowledge regarding environments, events, and actions that can be used to autonomously locate and procure data in service of user requests for information.

Figure 6:
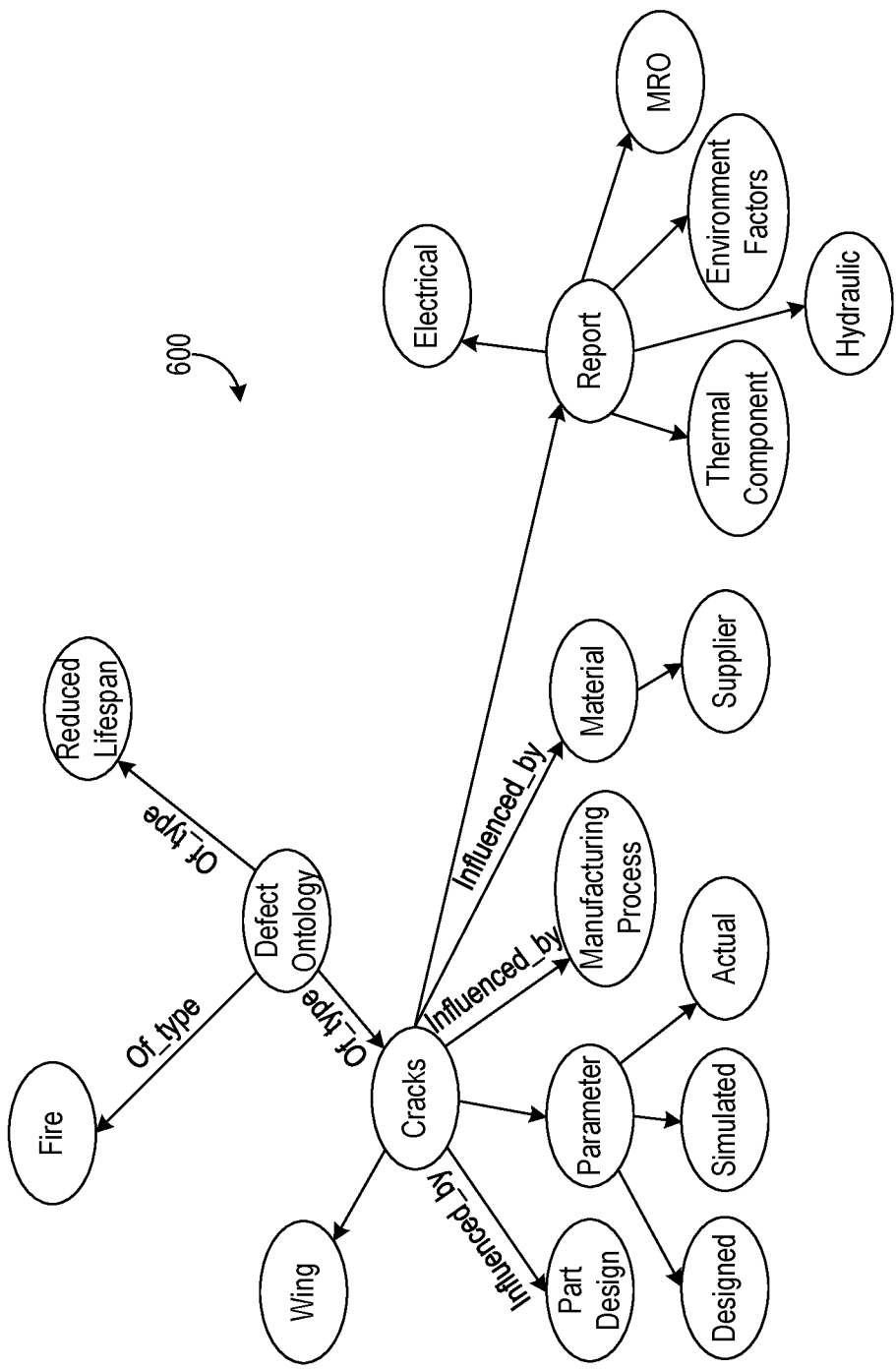
FIG. 6 shows an illustration depicting an example domain ontology.

Ontologies 314 other than knowledge ontology 500 can be used to obtain a conceptual understanding of request 304. For example, an ontology 314 that is relatively more specific to a domain than knowledge ontology 500—whose domain can be considered the general realm of knowledge—can be used to understand request 304. As one example, FIG. 6 depicts a domain ontology 600 encoding concepts and relationships in a defect/crack domain, which is the domain of request 304 as described above. Domain ontology 600 can be a subset of knowledge ontology 500, for example. Among the relationships encoded in domain ontology 600 are different types of defects, including cracks, fire, and reduced lifespan; various influences on the emergence of cracks, including part design, manufacturing processes, and materials; a part—namely, a wing—in which cracks can potentially form; and various types of reports that can indicate the presence of, or generally relate to, cracks, including reports regarding thermal components and environmental factors, hydraulic reports, MRO reports, and electrical reports.

Figure 7A:
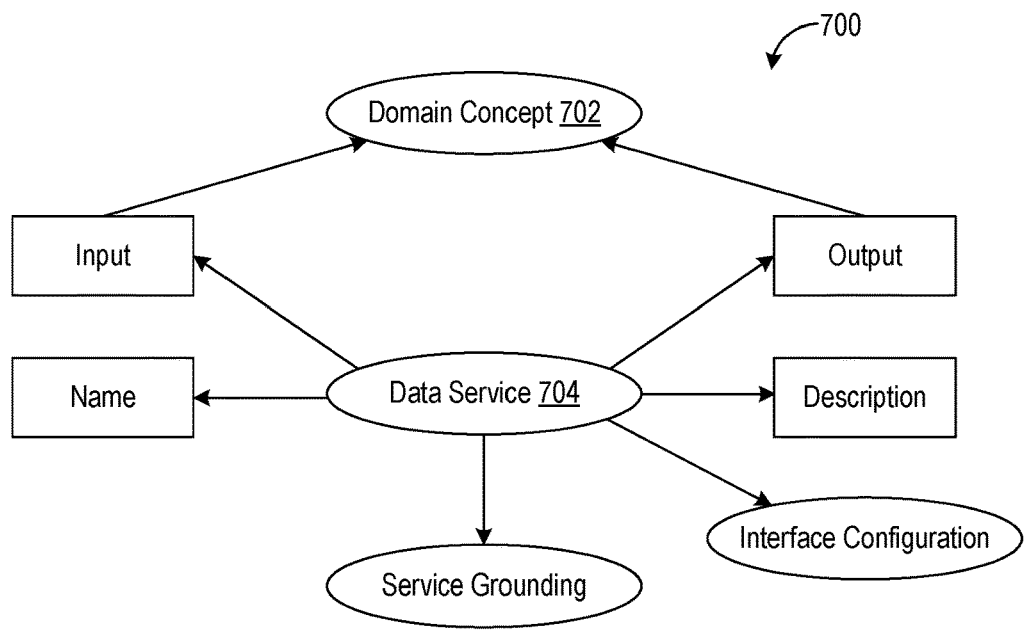
FIG. 7A-7B show illustrations depicting example service ontologies.
Figure 7B:
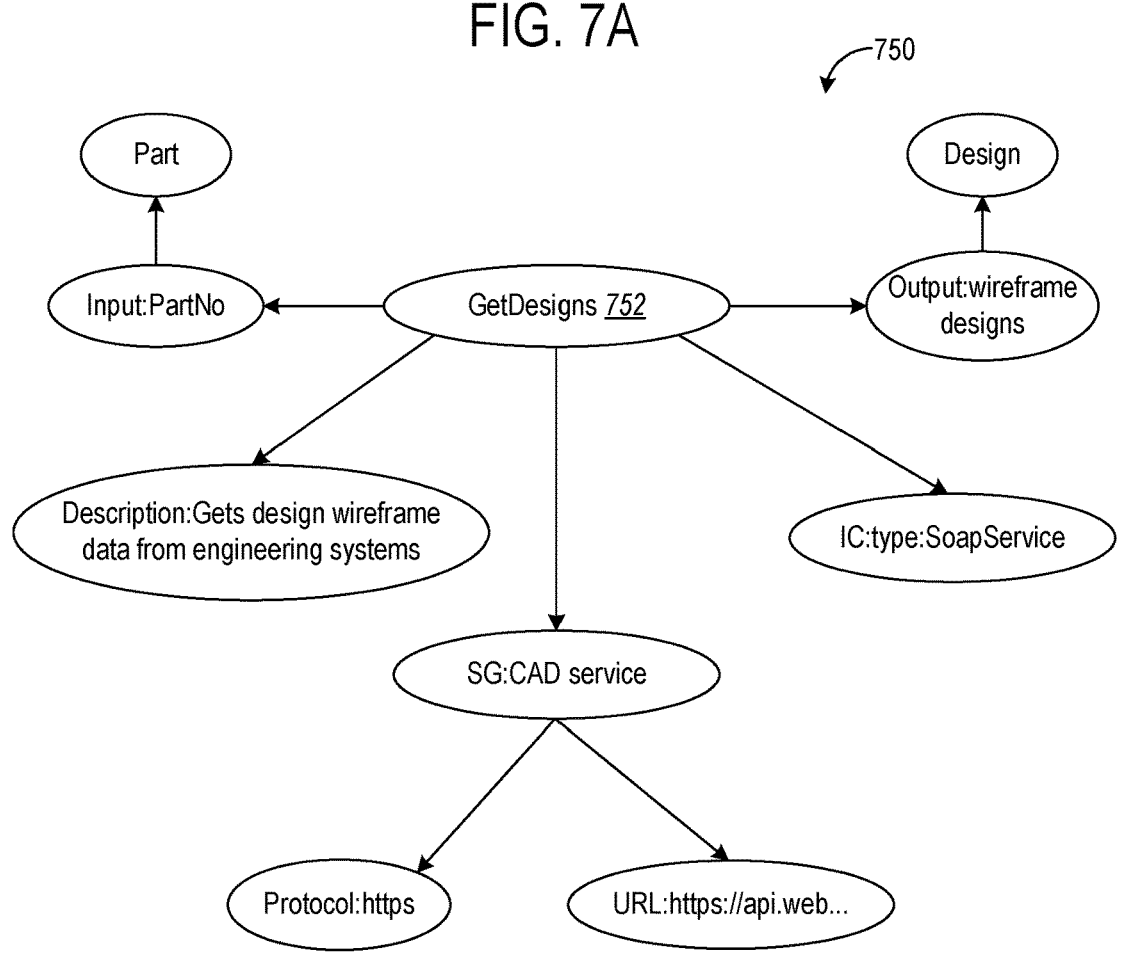

Computing system 300 can further employ one or more ontologies 314 to identify mechanisms with which information relevant to request 304 can be obtained, and to determine how to access those mechanisms to thereby obtain the relevant information. As examples, FIG. 7A depicts a generic representation of a service ontology 700 encoding generalized concepts and relationships regarding services and other mechanisms with which information can be obtained, and FIG. 7B depicts a service ontology 750 encoding concepts and relationships regarding a computer-aided design (CAD) data acquisition service that is accessible via the interne.

In service ontology 700, inputs and outputs are mapped to a domain concept 702, such as a concept encoded in one or more taxonomies 312. A data service 704, with which information relevant to concept 702 can be obtained, is associated with a name, a description, a service grounding, and an interface description. In service ontology 750 in FIG. 7B, a data acquisition service 752 accessible to obtain CAD data, where the service 752 is referred to as "GetDesigns", is linked to an input, which comprises a part number, and to an output, which comprises wireframe designs relevant to the part number. Service 752 is associated with a description indicating that the service 752 acquires wireframe design data from engineering systems. As such, ontology 750, by way of at least the description associated with service 752, indicates a data source—engineering systems—at which relevant data can be obtained. Service 752 is further associated with a service grounding indicating that the service 752 is a CAD service, where the service grounding is associated with a protocol (Hypertext Transfer Protocol Secure (HTTPS)) indicating the protocol by which relevant data can be obtained from the service 752, and a uniform resource locator (URL) at which such data can be obtained. Still further, service 752 is associated with an interface configuration indicating that data can be obtained from the service 752 via a simple object access protocol (SOAP).

Service ontologies 700 and 750 illustrate how data sources, at which information relevant to user requests is stored, can be located, and how mechanisms by which those data sources are accessible can be determined. Other service ontologies can be provided and leveraged to obtain data from any other suitable type of data source accessible via any suitable type of access mechanism. Example data sources include but are not limited to sensors, internet-of-things (IoT) devices, remote computing systems, cloud computing services, enterprise computing systems, information technology (IT) computing systems, HR computing systems, storage area networks (SANs), data lakes, data marts, data warehouses, and other systems of record. Example data access mechanisms by which data can be accessed from these and/or other data sources include but are not limited to HTTP, HTTPS, file transfer protocol (FTP), message queuing telemetry transport (MQTT), and various APIs. Further, in some examples, service ontologies can be provided on a per-concept basis, which can support the procurement of data on a granular level.

It will be understood that the taxonomies and ontologies described herein can be updated to increase the ability to parse, comprehend, and fulfill requests for information, and/or to adapt to changes over time (e.g., in view of advances and developments in relevant domains). Machine learning techniques, and/or any other suitable techniques, can be used to adapt taxonomies and ontologies in this manner. Updates can be performed based on implicit and/or explicit feedback from end users of the taxonomies and ontologies, for example.

Figure 8:
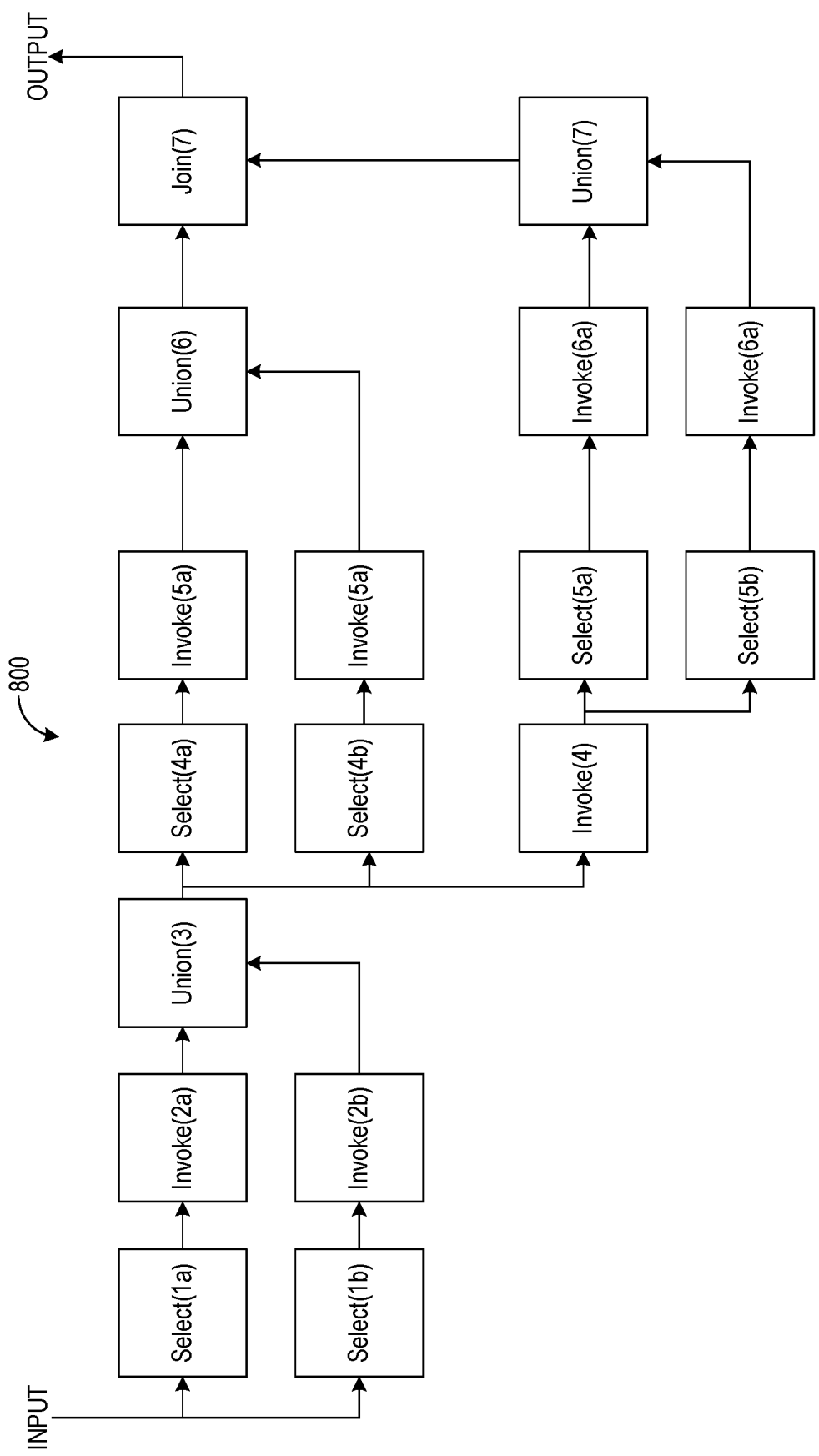
FIG. 8 shows an illustration depicting an example orchestration graph.

Returning to FIG. 3, computing system 300 can utilize unified information model 310 to identify information relevant to request 304, identify where the relevant information exists, and determine how the relevant information can be obtained. In view of the above, these processing steps can be performed in a substantially automated and programmatic manner through use of components of information model 310. Further, in some examples, the procurement of relevant information can also be performed in a substantially automated and programmatic manner. To this end, FIG. 3 depicts the inclusion of a reasoning engine 316 configured to formulate a query execution plan 317 for execution by one or more provisioning bots 318A-318N. In this example, execution plan 317 is formulated such that, when executed by provisioning bots 318A-318N, data relevant to request 304 is procured. Query execution plan 317 can be defined in any suitable manner. As one example, FIG. 8 depicts an example orchestration graph 800 that defines query execution plan 317, is formulated by computing system 300, and is configured for execution by provisioning bots 318A-318N. In this example, graph 800 exhibits a tree-like structure comprising nodes that each encode a processing step, such as a calculation (e.g., selection, invocation, union, join) or service call (e.g., database call, API call). The processing steps encoded in graph 800 can be executed by provisioning bots 318A-318N in a distributed and potentially parallel manner, which can increase the speed with which data relevant to request 304 is procured. Provisioning bots 318A-318N can be implemented as software executed on one or more computing devices in computing system 300, for example. Example computing hardware that can be implemented by computing system 300 is described below with reference to FIG. 11. Further, orchestration graph 800 can be formulated in any suitable manner. As one example, NLP pipeline 308 can output a SPARQL Protocol and RDF Query Language (SPARQL) query that is rewritten by computing system 300 into a query execution plan. Such a query execution plan derived in this manner can be used to obtain data stored in the resource description framework (RDF) format, for example. In such examples, one or more RDF views can be provided as input, in addition to the SPARQL query, to the query rewriting process.

Continuing with FIG. 3, one or more provisioning bots 318A-318N execute query execution plan 317 to thereby obtain information identified as being relevant to request 304. This relevant information includes non-synthesized data 320 obtained from one or more data sources 322, which can include enterprise resource planning (ERP) systems, engineering systems, factory IT and other IT systems, field systems, MRO systems, sources of sensor data (e.g., IoT networks), cloud services, and/or any other suitable data source(s). Non-synthesized data 320 includes a first portion of information that user 306 has permission to access, per their access credentials, and a second portion of information that the user 306 does not have permission to access. The lack of permission by user 306 to access the second portion of information of non-synthesized data 320 can arise from various factors, including but not limited to insufficient organizational access credentials, insufficient citizenship, and/or insufficient security clearances, as examples. Further, the provision of the second portion of information itself, from data sources 322 to a computing device associated with the user 306, can involve crossing a geographical boundary that invokes data export regulations that do not permit the user 306 to access the second portion of information. In such examples, data sources 322 can be geographically dispersed relative to one another and/or relative to the computing device associated with user 306. The second portion of information can be, whether subject to data export regulations or not, confidential, classified, and/or proprietary.

Accordingly, provisioning bots 318A-318N are configured to replace at least part of the second portion of the information with synthesized data 324 obtained from data synthesizer 124. In some examples, the entirety of the second portion can be replaced with synthesized data 324. In other examples, a portion, and not the entirety, of the second portion can be replaced with synthesized data 324, where the remaining part of the second portion that is not replaced with the synthesized data 324 can be masked, redacted, omitted, or otherwise not provided to user 306. In either case, synthesized data 324 is different from the second portion of information, is relevant to request 304, and does not include any information that user 306 does not have permission to access. Once obtained from data synthesizer 124, synthesized data 324 is packaged with the first portion of information—that user 306 has permission to access—to form a data set 326 that includes the first portion of information and the synthesized data 324, without any information that the user 306 does not have permission to access. Data set 326 can be made accessible to a computing device associated with user 306 (e.g., a computing device with which request 304 is placed) via data provisioning service 302, for example. Further, data set 326 can be configured for access by user 306 and not by other users, for example by encrypting the data set 326 and rendering the data set 326 decryptable with a decryption key specific to the user 306.

In some examples, query execution plan 317 can specify instructions executable by provisioning bots 318A-318N to identify the second portion of information that user 306 does not have permission to access, and to replace the second portion of information entirely in in part with synthesized data 324. To this end, provisioning bots 318A-318N can be provided the access credentials assigned to user 306 in order to identify the information to be replaced and/or redacted. FIG. 3 illustrates examples in which the access credentials of user 306 accompany request 304, which is sent to provisioning bots 318A-318N by data provisioning service 302. The provision of the access credentials of user 306, and the identification of information to be replaced and/or redacted according to those access credentials, can be implemented in any suitable manner, however.

Figure 9:
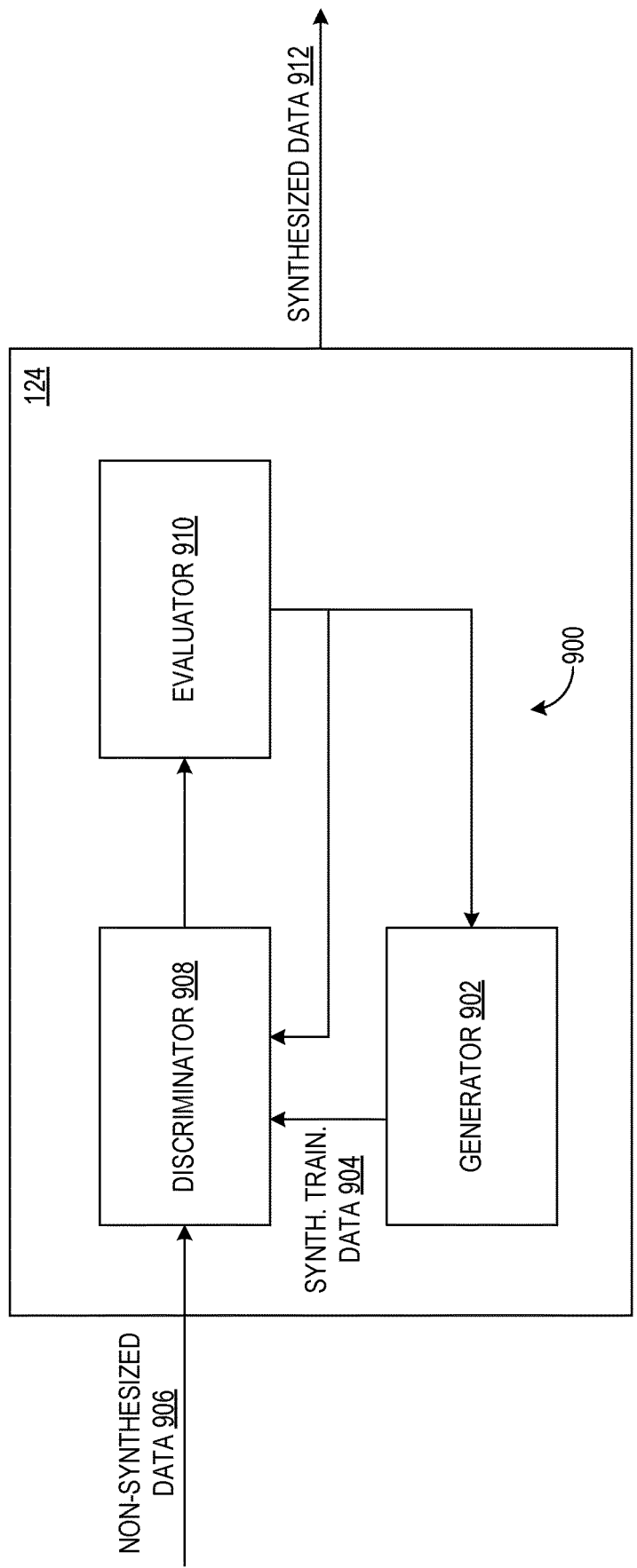
FIG. 9 shows an illustration depicting an example implementation of a data synthesizer.

Data synthesizer 124 can be implemented in any suitable manner. FIG. 9 illustrates one example implementation of data synthesizer 124 in which synthesized data is generated via a generative adversarial network (GAN) 900. GAN 900 includes a generator 902 configured to generate synthesized training data 904, which is fed, along with non-synthesized data 906, to a discriminator 908. Non-synthesized data 906 can be obtained from data sources 322, as one example. Discriminator 908 is configured to identify input data as either synthesized or non-synthesized, and provides an output based on this identification to an evaluator 910. Evaluator 910 provides output to both generator 902 and discriminator 908 to optimize the output of the generator 902 and the discriminative power of the discriminator 908. Upon reaching a desired number of training cycles, GAN 900 is operable to output synthesized data 912 that can be used in place of information that a requesting user does not have permission to access.

To illustrate the operation of provisioning bots 318A-318N and data synthesizer 124, an example follows in which information relevant to request 304 is obtained from data sources 322, and synthesized data 324 is obtained from the data synthesizer 124. In this example, request 304 is placed for information regarding cracks appearing on the wing structure of a particular aircraft, as described above. In response to request 304, information relevant to the request 304 is obtained from data sources 322. This can include obtaining (e.g., as a function of a part number, such as a part number of a wing or a component thereof) data regarding one or more of a part design, crack locations, a bill of materials, information regarding manufacturing processes, supplier information, MRO data, sustenance reports, environmental data, electrical reports, pneumatic reports, hydraulic reports, design parameters, simulation results, sensor readings, and materials information. However, user 306 may lack permission to access at least part of the materials information, which can be confidential, proprietary, and/or subject to export regulations with respect to the access credentials of the user 306. As such, data synthesizer 124 can be used to generate synthesized data 324 configured to replace at least part of the materials information. Synthesized data 324 can include information regarding other materials(s) that user 306 is permitted to access. The other material(s) can correspond in one or more aspects to material(s) for which information user 306 is not permitted to access, including but not limited to correspondences in material properties, chemical properties, engineering properties, uses, and applications.

Figure 10:
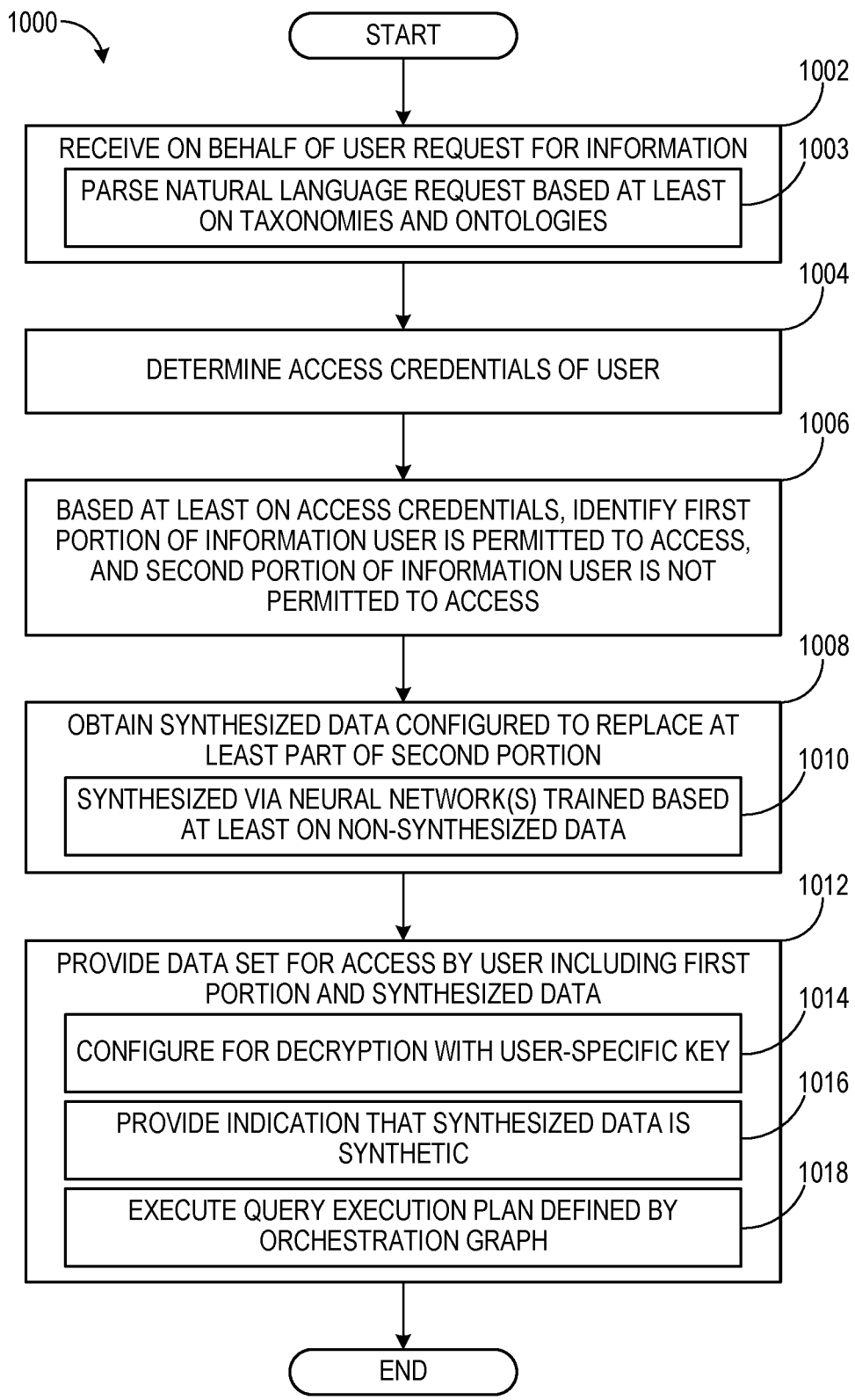
FIG. 10 shows a flowchart illustrating an example method of providing a data set including synthesized data generated based on the access credentials of a requesting user.

FIG. 10 depicts a flowchart illustrating a method 1000 of providing a data set including synthesized data generated based on the access credentials of a requesting user. Method 1000 can be implemented at computing system 300, for example.

At 1002, method 1000 includes receiving on behalf of a user a request for information. The request can include a natural language request. In such examples, receiving the request can include parsing 1003 the natural language request based at least on one or more taxonomies and ontologies. At 1004, method 1000 includes determining access credentials of the user. The access credentials can include one or more of an organizational access credential of the user, and a geographic location of the user, as examples.

At 1006, method 1000 includes, based at least on the access credentials, identifying a first portion of the information that the user has permission to access, and a second portion of the information that the user does not have permission to access. The second portion can be proprietary, confidential, classified, and/or subject to data export regulations that prevent the user from accessing the second portion from their location, for example. At 1008, method 1000 includes obtaining synthesized data configured to replace at least part of the second portion of the information. The synthesized data is different than the second portion of information, relevant to the request, and does not include any information that the user does not have permission to access. The synthesized data can be synthesized 1010 via one or more neural networks trained based at least on non-synthesized data.

At 1012, method 1000 includes providing a data set for access by the user. The data set includes the first portion of the information and the synthesized data. The data set can be configured 1014 to be decrypted via a user-specific decryption key. Providing the data set can include providing 1016 an indication that the synthesized data is synthetic. Providing the data set can include executing 1018 a query execution plan defined by an orchestration graph.

In view of the above, the disclosed approaches can provide a mechanism with which requests for information can be serviced despite portions of requested information being inaccessible to a requesting user. Rather than denying access to any of the requested information, at least part of a requested portion that the user does not have permission to access can instead be replaced with synthesized data that the user does have permission to access. While differing from the inaccessible portion, the synthesized data is nonetheless relevant to requests placed by the user, and as such can be used to fulfill these requests. Accordingly, greater levels of data access can be provided to requesting users while retaining security, confidentiality, and compliance with data export regulations. Moreover, the disclosed approaches provide mechanisms for obtaining data, both synthesized and non-synthesized, in an automated and programmatic manner that reduces or eliminates human involvement in the procurement of data. Accordingly, requested data can be provided in an efficient and secure manner, reducing the potential for stale data that can otherwise result from delays due to human involvement in procuring data and authorizing its release.

In some embodiments, the methods and processes described herein can be tied to a computing system of one or more computing devices. In particular, such methods and processes can be implemented as a computer-application program or service, an application-programming interface (API), a library, and/or other computer-program product.

Figure 11:
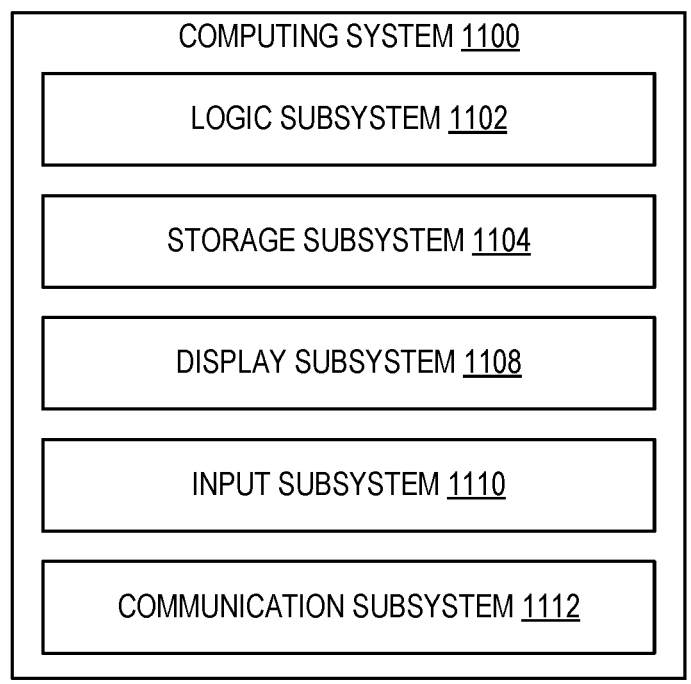
FIG. 11 shows an illustration depicting an example computing system.

FIG. 11 schematically shows a non-limiting embodiment of a computing system 1100 that can enact one or more of the methods and processes described above. Computing system 1100 is shown in simplified form. Computing system 1100 can take the form of one or more personal computers, server computers, tablet computers, home-entertainment computers, network computing devices, gaming devices, mobile computing devices, mobile communication devices (e.g., smart phone), and/or other computing devices.

Computing system 1100 includes a logic subsystem 1102 and a storage subsystem 1104. Computing system 1100 can optionally include a display subsystem 1108, input subsystem 1110, communication subsystem 1112, and/or other components not shown in FIG. 11.

Logic subsystem 1102 includes one or more physical devices configured to execute instructions. For example, the logic subsystem can be configured to execute instructions that are part of one or more applications, services, programs, routines, libraries, objects, components, data structures, or other logical constructs. Such instructions can be implemented to perform a task, implement a data type, transform the state of one or more components, achieve a technical effect, or otherwise arrive at a desired result.

The logic subsystem can include one or more processors configured to execute software instructions. Additionally or alternatively, the logic subsystem can include one or more hardware or firmware logic machines configured to execute hardware or firmware instructions. Processors of the logic subsystem can be single-core or multi-core, and the instructions executed thereon can be configured for sequential, parallel, and/or distributed processing. Individual components of the logic subsystem optionally can be distributed among two or more separate devices, which can be remotely located and/or configured for coordinated processing. Aspects of the logic subsystem can be virtualized and executed by remotely accessible, networked computing devices configured in a cloud-computing configuration.

Storage subsystem 1104 includes one or more physical devices configured to hold instructions executable by the logic subsystem to implement the methods and processes described herein. When such methods and processes are implemented, the state of storage subsystem 1104 can be transformed—e.g., to hold different data.

Storage subsystem 1104 can include removable and/or built-in devices. Storage subsystem 1104 can include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 1104 can include volatile, nonvolatile, dynamic, static, read/write, read-only, random-access, sequential-access, location-addressable, file-addressable, and/or content-addressable devices.

It will be appreciated that storage subsystem 1104 includes one or more physical devices. However, aspects of the instructions described herein alternatively can be propagated by a communication medium (e.g., an electromagnetic signal, an optical signal, etc.) that is not held by a physical device for a finite duration.

Aspects of logic subsystem 1102 and storage subsystem 1104 can be integrated together into one or more hardware-logic components. Such hardware-logic components can include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" can be used to describe an aspect of computing system 1100 implemented to perform a particular function. In some cases, a module, program, or engine can be instantiated via logic subsystem 1102 executing instructions held by storage subsystem 1104. It will be understood that different modules, programs, and/or engines can be instantiated from the same application, service, code block, object, library, routine, API, function, etc. Likewise, the same module, program, and/or engine can be instantiated by different applications, services, code blocks, objects, routines, APIs, functions, etc. The terms "module," "program," and "engine" can encompass individual or groups of executable files, data files, libraries, drivers, scripts, database records, etc.

It will be appreciated that a "service", as used herein, is an application program executable across multiple user sessions. A service can be available to one or more system components, programs, and/or other services. In some implementations, a service can run on one or more server-computing devices.

When included, display subsystem 1108 can be used to present a visual representation of data held by storage subsystem 1104. This visual representation can take the form of a graphical user interface (GUI). As the herein described methods and processes change the data held by the storage subsystem, and thus transform the state of the storage subsystem, the state of display subsystem 1108 can likewise be transformed to visually represent changes in the underlying data. Display subsystem 1108 can include one or more display devices utilizing virtually any type of technology. Such display devices can be combined with logic subsystem 1102 and/or storage subsystem 1104 in a shared enclosure, or such display devices can be peripheral display devices.

When included, input subsystem 1110 can comprise or interface with one or more user-input devices such as a keyboard, mouse, touch screen, or game controller. In some embodiments, the input subsystem can comprise or interface with selected natural user input (NUI) componentry. Such componentry can be integrated or peripheral, and the transduction and/or processing of input actions can be handled on- or off-board. Example NUI componentry can include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1112 can be configured to communicatively couple computing system 1100 with one or more other computing devices. Communication subsystem 1112 can include wired and/or wireless communication devices compatible with one or more different communication protocols. As non-limiting examples, the communication subsystem can be configured for communication via a wireless telephone network, or a wired or wireless local- or wide-area network. In some embodiments, the communication subsystem can allow computing system 1100 to send and/or receive messages to and/or from other devices via a network such as the Internet.

Further, the disclosure comprises configurations according to the following clauses.

Clause 1. At a computing system, a method, comprising receiving on behalf of a user a request for information;

determining access credentials of the user; based at least on the access credentials, identifying a first portion of the information that the user has permission to access, and a second portion of the information that the user does not have permission to access; obtaining synthesized data configured to replace at least part of the second portion of the information, the synthesized data being different than the second portion of information, relevant to the request, and not including any information that the user does not have permission to access; and providing a data set for access by the user, the data set including the first portion of the information and the synthesized data.

Clause 2. The clause of clause 1, where the request includes a natural language request, the method further comprising parsing the natural language request based at least on one or more taxonomies and ontologies.

Clause 3. The clause of clause 1, where the data set is encrypted, and where the data set is configured to be decrypted via a user-specific decryption key.

Clause 4. The clause of clause 1, where providing the data set comprises providing an indication that the synthesized data is synthetic.

Clause 5. The clause of clause 1, where the first portion of the information and the synthesized data are obtained from one or more data sources identified via an orchestration graph.

Clause 6. The clause of clause 5, where providing the data set comprises executing a query execution plan defined by the orchestration graph.

Clause 7. The clause of clause 1, where the synthesized data is synthesized via one or more neural networks trained based at least on non-synthesized data.

Clause 8. The clause of clause 1, where the access credentials of the user include one or more of an organizational access credential of the user, and a geographic location of the user.

Clause 9. A computing system, comprising a logic subsystem; and a storage subsystem comprising instructions executable by the logic subsystem to receive on behalf of a user a request for information; determine access credentials of the user; based at least on the access credentials, identify a first portion of the information that the user has permission to access, and a second portion of the information that the user does not have permission to access; obtain synthesized data configured to replace at least part of the second portion of the information, the synthesized data being different than the second portion of information, relevant to the request, and not including any information that the user does not have permission to access; and provide a data set for access by the user, the data set including the first portion of the information and the synthesized data.

Clause 10. The computing system of clause 9, where the request includes a natural language request, further comprising instructions executable to parse the natural language request based at least on one or more taxonomies and ontologies.

Clause 11. The computing system of clause 9, where the data set is encrypted, and where the data set is configured to be decrypted via a user-specific decryption key.

Clause 12. The computing system of clause 9, where the instructions executable to provide the data set are further executable to provide an indication that the synthesized data is synthetic.

Clause 13. The computing system of clause 9, where the first portion of the information and the synthesized data are obtained from one or more data sources identified via an orchestration graph.

Clause 14. The computing system of clause 13, where the instructions executable to provide the data set are further executable to execute a query execution plan defined by the orchestration graph.

Clause 15. The computing system of clause 9, where the synthesized data is synthesized via one or more neural networks trained based at least on non-synthesized data.

Clause 16. The computing system of clause 9, where the access credentials of the user include one or more of an organizational access credential of the user, and a geographic location of the user.

Clause 17. At a computing system, a method, comprising receiving on behalf of a user a request for information; determining access credentials of the user; based at least on the access credentials, identifying a first portion of the information that the user has permission to access, and a second portion of the information that the user does not have permission to access; generating, via one or more neural networks trained based at least on non-synthesized data, synthesized data configured to replace at least part of the second portion of the information, the synthesized data being different than the second portion of information, relevant to the request, and not including any information that the user does not have permission to access; and providing an encrypted data set for access by the user, the data set including the first portion of the information and the synthesized data.

Clause 18. The method of clause 17, further comprising parsing the request based at least on one or more taxonomies and ontologies.

Clause 19. The method of clause 17, wherein providing the data set comprises executing a query execution plan at one or more provisioning bots of the computing system.

Clause 20. The method of clause 17, where the access credentials of the user include one or more of an organizational access credential of the user, and a geographic location of the user.

The present disclosure includes all novel and non-obvious combinations and subcombinations of the various features and techniques disclosed herein. The various features and techniques disclosed herein are not necessarily required of all examples of the present disclosure. Furthermore, the various features and techniques disclosed herein may define patentable subject matter apart from the disclosed examples and may find utility in other implementations not expressly disclosed herein.

The invention claimed is:

1. At a computing system, a method, comprising:
   receiving on behalf of a user a request for information;
   determining access credentials of the user;
   from a plurality of domains, determining one or more domains implicated in the request for information;
   based at least on the access credentials, identifying a first portion of the information that the user has permission to access, and a second portion of the information that the user does not have permission to access;
   obtaining synthesized data generated by a data synthesizer trained based at least on non-synthesized data from the one or more domains implicated in the request for information, the synthesized data configured to replace at least part of the second portion of the information, the synthesized data being different than the second portion of information, contextually-relevant to the one or more domains implicated in the request for information, and not including any information that the user does not have permission to access; and providing a data set for access by the user, the data set including the first portion of the information and the synthesized data.

2. The method of claim 1, where the request includes a natural language request, the method further comprising parsing the natural language request based at least on one or more taxonomies and ontologies.

3. The method of claim 1, where the data set is encrypted, and where the data set is configured to be decrypted via a user-specific decryption key.

4. The method of claim 1, where providing the data set comprises providing an indication that the synthesized data is synthetic.

5. The method of claim 1, where the first portion of the information and the synthesized data are obtained from one or more data sources identified via an orchestration graph.

6. The method of claim 5, where providing the data set comprises executing a query execution plan defined by the orchestration graph.

7. The method of claim 1, where the synthesized data is synthesized via one or more neural networks trained based at least on the non-synthesized data, and where the synthesized data comprises one or more synthesized ranges of values.

8. The method of claim 1, where the access credentials of the user include one or more of an organizational access credential of the user, and a geographic location of the user.

9. A computing system, comprising:
a logic subsystem; and
a storage subsystem comprising instructions executable by the logic subsystem to:
receive on behalf of a user a request for information;
determine access credentials of the user;
from a plurality of domains, determine one or more domains implicated in the request for information;
based at least on the access credentials, identify a first portion of the information that the user has permission to access, and a second portion of the information that the user does not have permission to access;
obtain synthesized data generated by a data synthesizer trained based at least on non-synthesized data from the one or more domains implicated in the request for information, the synthesized data configured to replace at least part of the second portion of the information, the synthesized data being different than the second portion of information, contextually-relevant to the one or more domains implicated in the request for information, and not including any information that the user does not have permission to access; and
provide a data set for access by the user, the data set including the first portion of the information and the synthesized data.

10. The computing system of claim 9, where the request includes a natural language request, further comprising instructions executable to parse the natural language request based at least on one or more taxonomies and ontologies.

11. The computing system of claim 9, where the data set is encrypted, and where the data set is configured to be decrypted via a user-specific decryption key.

12. The computing system of claim 9, where the instructions executable to provide the data set are further executable to provide an indication that the synthesized data is synthetic.

13. The computing system of claim 9, where the first portion of the information and the synthesized data are obtained from one or more data sources identified via an orchestration graph.

14. The computing system of claim 13, where the instructions executable to provide the data set are further executable to execute a query execution plan defined by the orchestration graph.

15. The computing system of claim 9, where the synthesized data is synthesized via one or more neural networks trained based at least on the non-synthesized data.

16. The computing system of claim 9, where the access credentials of the user include one or more of an organizational access credential of the user, and a geographic location of the user.

17. At a computing system, a method, comprising:
receiving on behalf of a user a request for information;
determining access credentials of the user;
from a plurality of domains, determining one or more domains implicated in the request for information;
based at least on the access credentials, identifying a first portion of the information that the user has permission to access, and a second portion of the information that the user does not have permission to access;
generating, via one or more neural networks trained based at least on non-synthesized data from the one or more domains implicated in the request for information, synthesized data configured to replace at least part of the second portion of the information, the synthesized data being different than the second portion of information, contextually-relevant to the one or more domains implicated in the request for information, and not including any information that the user does not have permission to access; and
providing an encrypted data set for access by the user, the data set including the first portion of the information and the synthesized data.

18. The method of claim 17, further comprising parsing the request based at least on one or more taxonomies and ontologies.

19. The method of claim 17, wherein providing the data set comprises executing a query execution plan at one or more provisioning bots of the computing system.

20. The method of claim 17, where the access credentials of the user include one or more of an organizational access credential of the user, and a geographic location of the user.

* * * * *